United States Patent [19]
Saburi et al.

[11] Patent Number: 5,313,317
[45] Date of Patent: May 17, 1994

[54] HOLOGRAM

[75] Inventors: Toshiki Saburi, Inazawa; Minoru Ohta, Okazaki; Hirokatsu Mukai, Kuwana; Yasuhiro Mizutani, Mie; Tetsuya Kato, Okazaki, all of Japan

[73] Assignee: Nippondenso Co., Ltd., Kariya, Japan

[21] Appl. No.: 958,262

[22] Filed: Oct. 9, 1992

[30] Foreign Application Priority Data

Oct. 9, 1991 [JP] Japan .................. 3-262008

[51] Int. Cl.$^5$ ............. G02B 5/32; G03H 1/00; C02B 1/10
[52] U.S. Cl. ............. 359/13; 359/15; 359/1; 359/22; 359/580; 359/586; 359/588
[58] Field of Search ............. 359/8, 13, 22, 1, 15, 359/580, 586, 588

[56] References Cited

U.S. PATENT DOCUMENTS

| 3,601,017 | 8/1971 | Glatzer et al. |
|---|---|---|
| 3,635,540 | 1/1972 | Nassenstein |
| 4,530,564 | 7/1985 | Close |
| 4,586,780 | 5/1986 | Chern et al. ............. 359/34 |
| 5,181,141 | 1/1993 | Sato et al. ............. 359/580 |

FOREIGN PATENT DOCUMENTS

| 57-74708 | 5/1982 | Japan |
|---|---|---|
| 62-80687 | 4/1987 | Japan |
| 1231082 | 9/1989 | Japan |
| 2140787 | 5/1990 | Japan |

Primary Examiner—Loha Ben
Assistant Examiner—Thomas Robbins
Attorney, Agent, or Firm—Cushman, Darby & Cushman

[57] ABSTRACT

A hologram includes an optically transparent base plate having first and second opposite surfaces. A hologram element is provided on the first surface of the base plate, and has a predetermined holographic pattern. An optically transparent member has first and second opposite surfaces. The first surface of the member faces the hologram element. An arrangement serves to prevent light, which successively passes through the transparent base plate, the hologram element, and the member and is then reflected at a boundary between the second surface of the member and an atmosphere, from travelling back to the hologram element.

18 Claims, 5 Drawing Sheets

HOLOGRAM

BACKGROUND OF THE INVENTION

1. Field of the Invention

This invention relates to a hologram.

2. Description of the Prior Art

Systems commonly used in aircraft to display images of instruments in the field of view of a pilot are termed "head-up displays". Some of the head-up displays employ holograms to project a virtual image of an instrument into the pilot's field of view as the pilot looks through the forward window of the aircraft.

Also, holographic head-up displays for automotive vehicles have been developed.

It is desirable that holograms used in head-up displays generate an acceptably low level of noise or ghost.

Japanese published unexamined patent application 62-80687 discloses the fabrication of a hologram in which an antireflection film is formed on a photosensitive film of a hologram-forming base plate (substrate). During a light exposure step which takes place during in the fabrication of a hologram, the antireflection film decreases the reflection of reference light at the boundary of air with the photosensitive film so that spurious hologram recordings are reduced. The reduction of spurious hologram recordings enables a decrease in the level of noise or ghost when an image is reproduced or indicated from the resultant hologram.

In general, advanced holograms have complicated structures. The complicated structures, however, tend to cause noise during image reproduction.

SUMMARY OF THE INVENTION

It is an object of this invention to provide an improved hologram.

A first aspect of this invention provides a hologram comprising an optically transparent base plate having first and second opposing surfaces; a hologram element provided on the first surface of the base plate and having a predetermined holographic pattern; an optically transparent member having first and second opposing surfaces, wherein the first surface of the member faces the hologram element; and means for preventing light from travelling back to the hologram element where said light successively passes through the transparent base plate, the hologram element, and the member and which is then reflected at a boundary between the second surface of the member and an atmosphere.

A second aspect of this invention provides a hologram comprising an optically transparent base plate having first and second opposite surfaces; a hologram element provided on the first surface of the base plate and having a predetermined holographic pattern; a first reflection control layer being optically transparent and being provided at a side of the second surface of the base plate for preventing light, which is applied toward the second surface of the base plate and is reflected at a boundary between the second surface of the base plate and an atmosphere, from travelling in a direction equal to a direction of travel of reconstructed light generated via the hologram element; an optically transparent member having first and second opposing surfaces, wherein the first surface of the member faces the hologram element; and a second reflection control layer provided on the second surface of the member for preventing light from travelling back to the hologram element, which where said light successively passes through the transparent base plate, the hologram element, and the member and is then reflected at a boundary between the second surface of the member and an atmosphere.

A third aspect of this invention provides a hologram comprising an optically transparent base plate having first and second opposing surfaces; a hologram element provided on the first surface of the base plate and having a predetermined holographic pattern; a first optically transparent member having first and second opposing surfaces, wherein the first surface of the first member faces the hologram element, first means for preventing light from travelling back to the hologram element where said light successively passes through the transparent base plate, the hologram element, and the first member and is then reflected at a boundary between the second surface of the first member and an atmosphere; a second optically transparent member having first and second opposite surfaces, wherein the first surface of the second member faces the second surface of the base plate; and second means for preventing light, which is applied toward the second surface of the second member and is reflected at a boundary between the second surface of the second member and an atmosphere, from travelling in a direction equal to a direction of travel of reconstructed light generated via the hologram element.

In embodiments of this invention, since the member and the first and second members serve to cover the base plate, they may also be referred to as cover members or cover plates. The cover members and the base plate may be made of glass such as soda glass or various plastics. It is preferable that a surface of the first member which faces atmosphere has an antireflection film. It is preferable that a surface of the second member which faces an atmosphere has an anti-scattering film.

The anti-scattering film has such a light absorbing function as to prevent light, which successively passes through the transparent base plate, the hologram element, and the first member and is then reflected at a boundary between the second surface of the first member and an atmosphere, from travelling back to the hologram element. The antireflection film serves to prevent light, which is applied toward the hologram element via the second surface of the second member, from being reflected at a boundary between the second surface of the second member and an atmosphere.

The anti-scattering film may use a tape or a mixture of black or other pigment and epoxy, melanin, acrylic, or other synthetic resin binder. The anti-scattering film may also be made of a black paint. The antireflection film may be made of $MgF_2$, $TiO_2$, $ZrO_2$, or $SiO_2$. The antireflection film may be composed of a single layer of $MgF_2$, $TiO_2$, $ZrO_2$, or $SiO_2$. The antireflection film may have a laminated structure of layers of these substances.

In the case where the hologram element includes a layer of dichromated gelatin, it is preferable that the refractive indexes of the member, the first and second members, and the base plate are substantially equal to the refractive index of the dichromated gelatin layer. For example, the refractive indexes of the member, the first and second members, and the base plate are preferably in the range of 1.5 to 1.6.

The member and the base plate with the hologram element may be bonded together by sealing material provided therebetween. The first member, the base plate with the hologram element, and the second member may be bonded together by sealing material provided therebetween. It is preferable that the sealing material is made of organic resin of an ultraviolet-ray hardening type or organic resin of a thermosetting type. The sealing material may be designed so as to protect the hologram element from moisture of an atmosphere. A sealing width "W" is defined as a width of a region filled with only the sealing material by which the hologram element is separated from an atmosphere. The sealing width "W" is chosen in consideration of moisture absorption characteristics of the sealing material and conditions of practical use of the hologram. The sealing width "W" is shown in FIGS. 1 and 2.

The hologram element is made by exposing photopolymer or photosensitive material, such as dichromated gelatin, agar, or albumen, to light. The hologram element is most preferably made of dichromated gelatin. The hologram element may be of an embossed structure. A medium (corresponding to a holographic pattern) recorded on the photosensitive material, that is, the hologram element, is a lens in embodiments of this invention. Letters, numerals, or pictures may be recorded on the hologram element as a recorded medium.

Laser light is used in the exposure process on the photosensitive material. During the exposure process, interference fringes of the laser light which correspond to the holographic pattern are recorded on the photosensitive material. The pitch of the interference fringes on the photosensitive material can be varied by changing the incident angle of the laser light with respect to the photosensitive material. It is understood from the characteristics of Bragg reflection that the wavelength of light reconstructed by the hologram element depends on the pitch of the holographic pattern on the hologram element. Thus, by applying the laser light beam at different incident angles, holographic patterns having different pitches can be recorded on the photosensitive material. This technique enables the addition of a filtering function to the hologram element. In the case of a hologram element having holographic patters of different pitches, when a white light beam is applied to the hologram element, light beams of different colors can be reconstructed.

In this invention, "optically transparent" means both "fully transparent" and "semitransparent". In a special case, "optically transparent" means "opaque".

DESCRIPTION OF THE PREFERRED EMBODIMENTS

Figure 1:
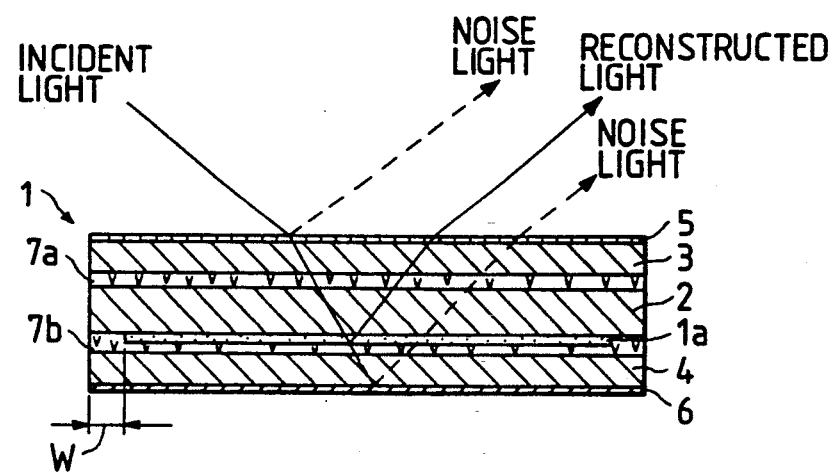
FIG. 1 is a sectional view of a hologram according to an embodiment of this invention.
Figure 2:
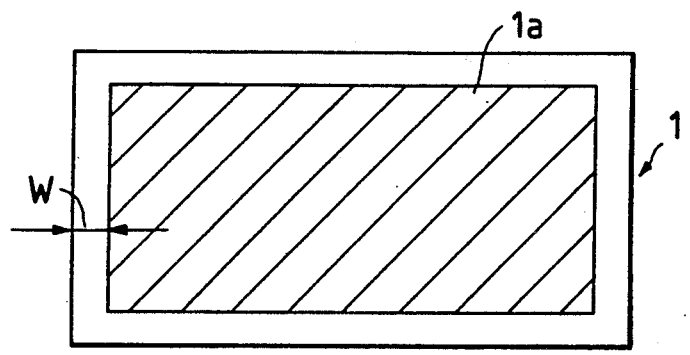
FIG. 2 is a plan view of the hologram of FIG. 1.

With reference to FIGS. 1 and 2, a hologram 1 includes a transparent base plate (substrate) 2 made of glass and having, for example, a rectangular shape. The base plate 2 has a predetermined uniform thickness. The base plate 2 has opposite larger surfaces, that is, upper and lower surfaces in FIG.

In FIG. 1, a given area of the lower surface of the base plate 2 except edges thereof is provided or coated with a film of a hologram element 1a which has a predetermined uniform thickness and which has a rectangular shape similar to but smaller than the shape of the base plate 2. The hologram element 1a holds a predetermined pattern or a predetermined recorded medium. During the fabrication of the hologram 1, by exposing photosensitive material, which will form the hologram element 1a, to light, the predetermined pattern (the recorded medium) provided by interference fringes are recorded on the photosensitive material. As will be described later, the recorded medium corresponds to a concave lens serving as a magnifying lens.

Interference fringes having a pitch of 290 nm and interference fringes having a pitch of 320 nm are recorded on the hologram element 1a. These recordings are executed by changing a direction or angle of a laser light beam being incident to the photosensitive material and forming the interference fringes. The interference fringes are of two different shape types having predetermined curvatures to simultaneously record information of the concave lens and information of color.

In FIG. 1, a transparent cover plate 3 made of glass extends above the base plate 2. The cover plate 3 has a rectangular shape equal to the shape of the base plate 2 and is aligned with the base plate 2. The cover plate 3 has a predetermined uniform thickness. The cover plate 3 has opposite larger surfaces, that is, upper and lower surfaces in FIG. 1. In FIG. 1, the entire area of the upper surface of the cover plate 3 is coated with an antireflection film 5 having a predetermined uniform thickness. The antireflection film 5 is exposed to atmosphere.

In FIG. 1, a transparent cover plate 4 made of glass extends below the base plate 2. The cover plate 4 has a rectangular shape equal to the shape of the base plate 2 and is aligned with the base plate 2. The cover plate 4 has a predetermined uniform thickness. The cover plate 4 has opposite larger surfaces, that is, upper and lower surfaces in FIG. 1. In FIG. 1, the entire area of the lower surface of the cover plate 4 is coated with an anti-scattering film 6 having a predetermined uniform thickness. The anti-scattering film 6 is exposed to atmosphere.

A layer 7a of transparent sealing material which has a predetermined uniform thickness is provided between the base plate 2 and the cover plate 3. A layer 7b of transparent sealing material is provided between the hologram element 1a and the cover plate 4, and between the edges of the base plate 2 and the cover plate 4. The hologram element 1a is isolated from atmosphere by the sealing layer 7b so that it is protected from moisture of atmosphere. In FIGS. 1 and 2, portions of the sealing layer 7b which effect the isolation of the hologram element 1a from atmosphere have a predetermined width (sealing width) "W".

In operation of the hologram 1 of FIG. 1, a beam of incident light enters the hologram I via the antireflection film 5. Specifically, the incident light beam successively passes through the antireflection film 5, the cover plate 5, the sealing layer 7a, and the base plate 2, and then reaches the hologram element 1a. The incident light beam is diffracted and reflected by the predetermined pattern on the hologram element 1a, being converted into a diffraction-resultant light beam or a reconstructed light beam. The reconstructed light beam moves back through the base plate 2, the sealing layer 7a, the cover plate 3, and the antireflection film 5. The reconstructed light beam exits from the hologram 1.

Figure 3:
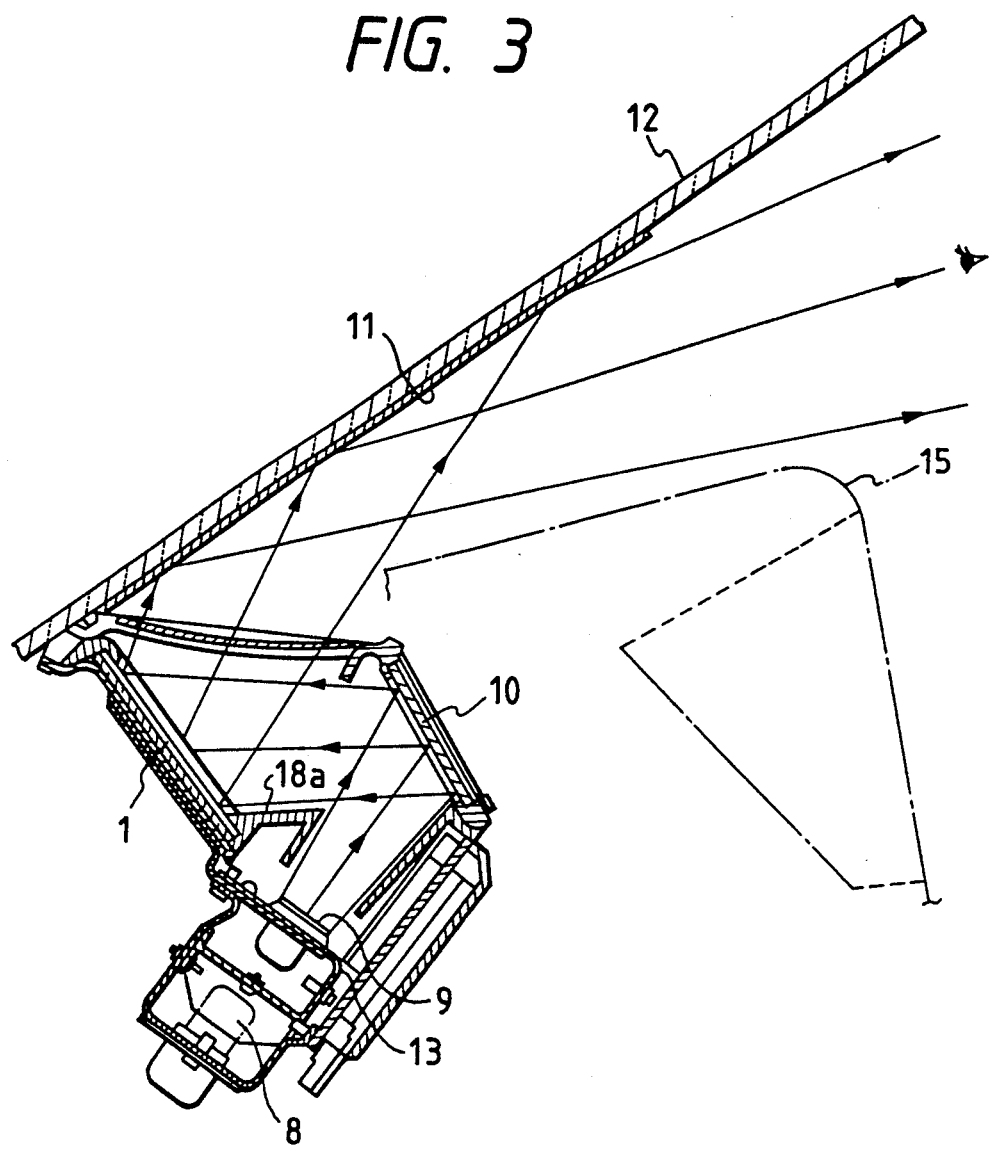
FIG. 3 is a sectional view of an automotive head-up display using the hologram of FIGS. 1 and 2.
Figure 4:
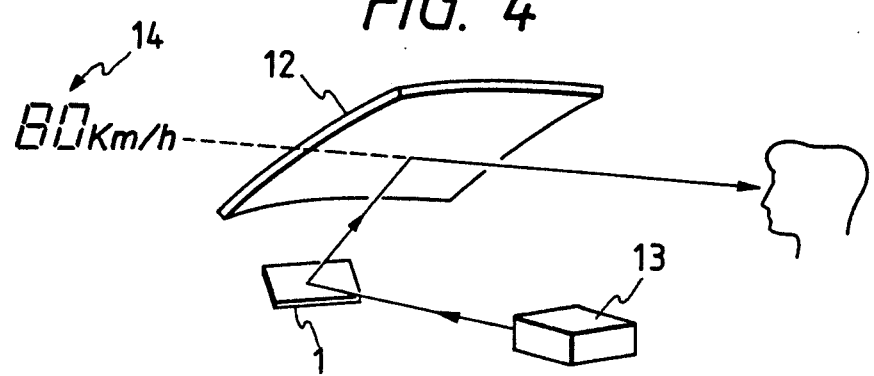
FIG. 4 is a perspective diagram of the automotive head-up display of FIG. 3.

As shown in FIGS. 3 and 4, the hologram 1 of FIGS. 1 and 2 can be used in a head-up display for an automotive vehicle. Specifically, the head-up display includes an indicator frame 13 on which an incandescent light 8, a liquid crystal panel 9, a mirror 10, and the hologram 1 are supported. The liquid crystal panel 9 is located in front of the incandescent light 8. The liquid crystal panel 9 functions to indicate information of a vehicle speed, master warning, a direction, a map, and others. In general, the indicator assembly 13 is located near a vehicle instrument panel 15.

The head-up display of FIGS. 3 a-nd 4 operates as follows. A light beam emitted from the incandescent light 8 passes through the liquid crystal panel 9, and then reaches the mirror 10. While the light beam passes through the liquid crystal panel 9, it carries information indicated by the liquid crystal panel 9. The light beam is reflected by the mirror 10, and then reaches the hologram 1. The light beam is diffracted and reflected by the hologram 1, being converted into a reconstructed light beam. The reconstructed light beam exits from the hologram element 1, and then reaches a film 11 on a vehicle windshield 12. The formation of the film I 1 on the vehicle windshield is based on a vapor deposition process. The reconstructed light beam is reflected by the film 1 1 on the windshield 1 1 toward driver's eyes. Thus, a virtual image 14 of the information indicated by the liquid crystal panel 9 is projected into the driver's field of view as the driver looks through the windshield.

The antireflection film 5 prevents the incident light beam from being reflected at a boundary between the antireflection film 5 and atmosphere. The antireflection film 5 may be designed so as to prevent the incident light beam, which has been reflected at a boundary between the second surface of the base plate and atmosphere, from travelling in a direction equal to a direction of travel of the reconstructed light generated via the hologram element. Thus, the antireflection film 5 reduces noise or ghost light. The anti-scattering film 6 prevents the light beam, which has successively passed through the base plate 2, the hologram element 1a, and the cover plate 4 and has then been reflected at a boundary between the lower surface of the cover plate 4 and atmosphere, from travelling back to the hologram element la. Thus, the anti-scattering film 6 reduces noise or ghost light.

Figure 8:
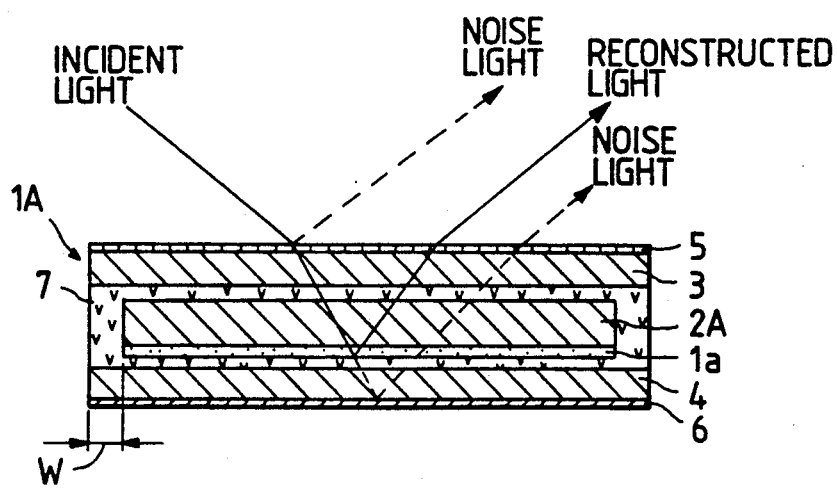
FIG. 8 is a sectional view of a first modified hologram according to an embodiment of this invention.

FIG. 8 shows a first modified hologram 1A which is similar to the hologram 1 of FIGS. 1 and 2 except for design changes described hereinafter. The hologram 1A includes a base plate 2A, the size of which is reduced in comparison with the size of the base plate 2 of FIGS. 1 and 2 by a value corresponding to the sealing layer width "W". In FIG. 8, the entire area of the lower surface of the base plate 2A contacts a hologram element 1a. The combination of the base plate 2A and the hologram element 1a are completely surrounded by sealing material 7.

Figure 10:
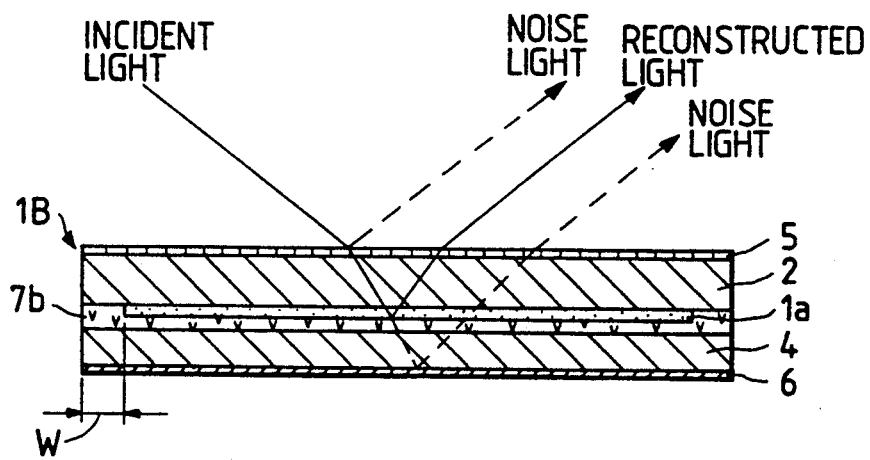
FIG. 10 is a sectional view of a second modified hologram according to an embodiment of this invention.

FIG. 10 shows a second modified hologram 1B which is similar to the hologram 1 of FIGS. 1 and 2 except for design changes described hereinafter. In the hologram 1B of FIG. 10, the cover plate 3 and the sealing layer 7a (see FIG. 1) are omitted. The hologram 1B of FIG. 10 includes a base plate 2, the upper surface of which is coated with an antireflection film 5.

Figure 11:
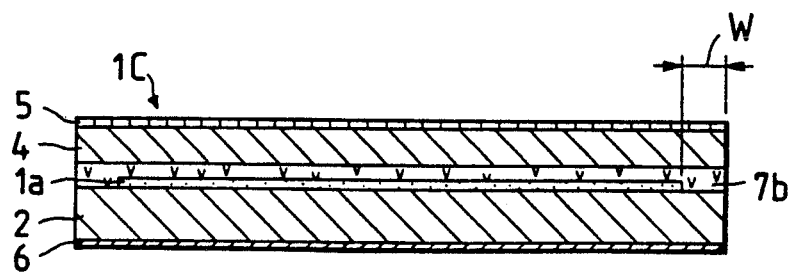
FIG. 11 is a sectional view of a third modified hologram according to an embodiment of this invention.

FIG. 11 shows a third modified hologram 1C which is similar to the hologram 1B of FIG. 10 except for design changes described hereinafter. The hologram 1C of FIG. 11 is inverted with respect to the hologram 1B of FIG. 10. In the hologram 1C of FIG. 11, the surface of a base plate 2 which is remote from a hologram element 1a is coated with an anti-scattering film 6, and the surface of a cover plate 4 which is remote from the hologram element 1a is coated with an antireflection film 5.

Figure 5:
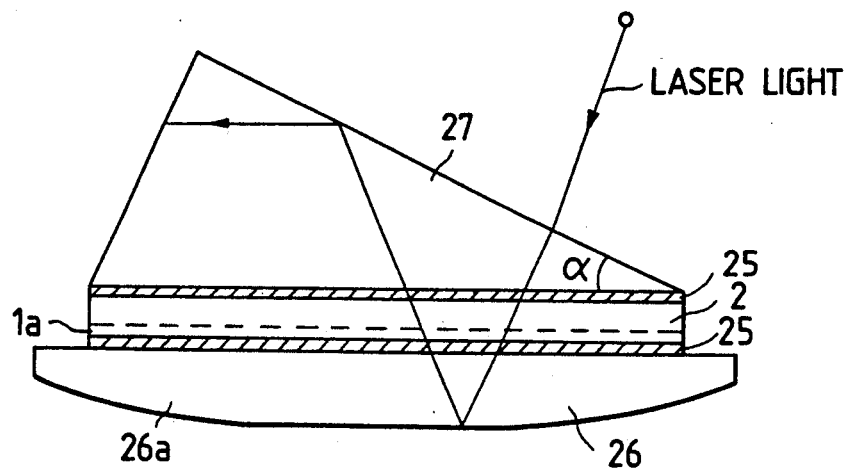
FIG. 5 is a sectional view of an optical arrangement used in the fabrication of the hologram of FIGS. 1 and 2.

The hologram of FIGS. 1 and 2 was fabricated as follows. First, as shown in FIG. 5, a transparent base plate 2 made of glass was prepared, and a layer 1a of photosensitive material was formed on one surface of the base plate 2. The photosensitive material used dichromated gelatin (D. C. G). The photosensitive layer 1a had a thickness of 10 $\mu$m to 40 $\mu$m. After the photosensitive layer 1a was subjected to gelation or was dried, it was stabilized within atmosphere having a temperature of 20° C. and a relative humidity (RH) of 50%. Then, a predetermined pattern corresponding to a concave lens or a magnifying lens was recorded on the photosensitive layer 1a. The photosensitive layer 1a was successively subjected to a development process and a drying process so that the photosensitive layer 1a was made into a hologram element. A transparent cover plate 3, one surface of which was coated with an antireflection film 5, was prepared. In addition, a transparent cover plate 4, one surface of which was coated with an anti-scattering film 6, was prepared. Subsequently, as shown in FIG. 1, the base plate 2 with the hologram element 1a was placed between the cover plates 3 and 4 while a sealing layer 7a including adhesive was provided between the base plate 2 and the cover plate 3 and a sealing layer 7b including adhesive was provided between the cover plate 4 and the base plate 2 with the hologram element 1a. The cover plate 3 with the antireflection film 5, the base plate 2 with the hologram element 1a, and the cover plate 4 with the anti-scattering film 6 were bonded together by the sealing layers 7a and 7b.

Specifically, the recording of the predetermined pattern on the photosensitive layer 1a was executed as follows. As shown in FIG. 5, the base plate 2 with the photosensitive layer 1a was placed between a lens 26 and a prism 27. The lens 26 was a recorded medium. In other words, the predetermined pattern recorded on the photosensitive layer 1a corresponded to the lens 26. The lens 26 had a flat surface which faced the photosensitive layer 1a on the base plate 2. The surface of the base plate 2 which was remote from the photosensitive layer 1a faced a flat bottom surface of the prism 27. The lens 26 and the prism 27 had refractive indexes which were approximately equal to the refractive index of the base plate 2. The lens 26 had a predetermined focal length. Silicone oil 25 was provided between the base plate 2 with the photosensitive layer 1a and the lens 26, and between the base plate 2 and the prism 27. The silicone oil 25 served as refractive index matching liquid. An argon laser light beam having a wavelength of 514.5 nm was applied to an input surface of the prism 27. After the light beam entered the prism 27 via its input surface, the light beam successively passed through the prism 27, the silicone oil 25, the base plate 2, the photosensitive layer 1a, the silicone oil 25, and the lens 26. Since the combination of the prism 27, the silicone oil 25, the base plate 2, the photosensitive layer 1a, the silicone oil 25, and the lens 26 had an essentially uniform refractive index, the light beam travelled along a straight path. The light beam was reflected by a reflecting film (not shown) formed on a surface of the lens 26 which was remote from the photosensitive layer 1a. The reflected light beam travelled back through the lens 26 and the silicone oil 25, and then entered the photosensitive layer 1a. In the photosensitive layer 1a, the forward light beam (incoming light beam) and the reflected light beam (return light beam) interfered with each other so that they formed interference fringes corresponding to a predetermined pattern determined by the lens 26. The predetermined pattern corresponding to the interference fringes were recorded on the photosensitive layer 1a.

A portion of the reflected light beam was reflected by the surface of the base plate 2 while another portion of the reflected light beam entered the base plate 2 and then travelled through the base plate 2 and the silicone oil 25. After the light beam travelled through the silicone oil 25, it entered the prism 27 and then reached the input surface thereof. A portion of the light beam was reflected at the input surface of the prism 27. The angle $\alpha$ between the input surface and the bottom surface of the prism 27 was chosen so that the light beam reflected at the input surface of the did not return toward the photosensitive layer 1a. Thus, noise or spurious hologram recordings were eliminated. The angle $\alpha$ was preferably equal to 30°. For further elimination of noise or spurious hologram recordings, it was preferable that a black paint was applied to a non-input surface (the left-hand surface in FIG. 5) of the prism 27 to prevent the light beam, which was reflected at the input surface, from being reflected again by the non-input surface toward the photosensitive layer 1a.

Since the base plate 2 and the prism 27 had essentially the same refractive index, the reflected light beam travelled from the base plate 2 to the prism 27 via the silicone oil 25 without being reflected toward the photosensitive layer 1a at the surface of the base plate 2 which was close to the prism 27. Thus, in this regard, noise or spurious hologram recordings were eliminated also.

FIRST EXAMPLE

A transparent base plate made of soda glass was prepared. The base plate had a refractive index of about 1.52. The base plate had a size of 112 mm×46 mm×1.8 mm. A layer of dichromated gelatin (D. C. G), that is, photosensitive material, was formed on one surface of the base plate. The photosensitive layer had a thickness of 25 μm. The photosensitive material was made by dissolving 0.6 g (gram) of ammonium dichromate in 100 ml of 4% gelatine solution. The photosensitive material had a refractive index of about 1.55. The base plate with the photosensitive layer was placed in a drier for 72 hours. The drier was filled with atmosphere having a temperature of 20° C. and a relative humidity (RH) of 50%. Then, by using the optical arrangement of FIG. 5, a predetermined pattern corresponding to a concave lens or a magnifying lens 26 was recorded on the photosensitive layer in a light exposure process. Specifically, the photosensitive layer was exposed to an argon laser light beam with a wavelength of 514.5 nm while the incident angle of the light beam was changed between two predetermined angles. This change of the incident angle of the light beam was designed so that, during practical use of a resultant hologram, reconstructed light beams of two different colors or wavelengths (for example, 540 nm and 600 nm in the case of an incident angle of 33.5°) could be generated. The total power of the laser light beam applied to the photosensitive layer was 500 mJ. The focal length of the lens 26 in the light exposure arrangement of FIG. 5 was 1,000 mm. After the light exposure process, the base plate with the photosensitive layer was washed in water until the color thereof was lost. Then, the base plate with the photosensitive layer was dipped in commercially-available photography hardening fixer (for example, "Rapid Fixer" produced by Eastman Kodak Company) for 10 minutes. The base plate with the photosensitive layer was washed in water again, and was then dipped in 90% isopropanol solution for 10 minutes. The base plate with the photosensitive layer was dried by hot air. Then, the base plate with the photosensitive layer was subjected to a thermally-ageing process to prevent a change of characteristics of the predetermined pattern on the photosensitive layer during practical use of the hologram. Specifically, the base plate with the photosensitive layer was heated at 150° C. for 4 hours. To provide a 5-mm sealing layer width "W" of FIGS. 1 and 2, edges of the photosensitive layer were removed. In this way, the photosensitive layer was made into a hologram element.

A first cover plate having a size of 112 mm×46 mm×1.0 mm was prepared. The first cover plate had a 4-layer laminated structure in which of MgF$_2$ layers and TiO$_2$ layers alternated with each other. An antireflection film was formed on one surface of the first cover plate. The antireflection film had a luminous reflectance of 0.3%. Similarly, a second cover plate having a size of 112 mm×46 mm×1.0 mm was prepared. An anti-scattering film having a thickness of 10 μm was formed on one surface of the second cover plate. The anti-scattering film was made by adding black pigment to epoxy resin at a weight ratio of 5% and mixing the black pigment and the epoxy resin. The black pigment used, for example, "Glass Lite 500" produced by Ca shew. Sealing material having a refractive index of 1.55 was applied to the other surfaces of the first and second cover plates respectively so that layers of the sealing material were formed thereon. The sealing layers had a thickness of 50 μm. The sealing material was made of epoxy thermosetting resin (for example, "CS-2340-5" produced by Cemedine Company). The base plate with the hologram element was placed between the first and second cover plates as shown in FIG. 1, and they were bonded together by the sealing layers.

The previously-mentioned luminous reflectance (Y %) was calculated by referring to the following equation.

$$Y\% = 100 \int_{400}^{750} S(\lambda)R(\lambda)y(\lambda)d\lambda / \int_{400}^{750} y(\lambda)d\lambda$$

where γ denoted a light wavelength changed at pitches of 10 nm; S(γ) denoted a flat light source and thus S(γ)=1; R(γ) denoted a spectral reflection spectrum; and y(k) denoted a color matching function of 1931CIE.

SECOND EXAMPLE

Figure 9:
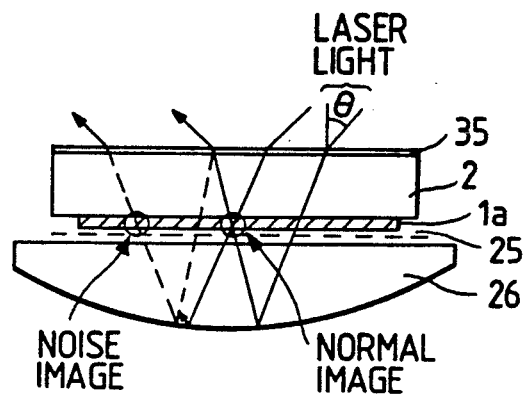
FIG. 9 is a sectional view of an optical arrangement used in the fabrication of a hologram.

A second example was similar to the first example except for a method of executing hologram recordings on a photosensitive layer. Specifically, as shown in FIG. 9, a surface of a base plate 2 which was remote from a photosensitive layer 1a was coated with an anti-reflection film 35. A lens 26 was placed in a manner such as to face the photosensitive layer 1a on the base plate 2. Silicone oil 25 serving as refractive index matching liquid was provided between the photosensitive layer 1a and the lens 26. An argon laser light beam was applied to the photosensitive layer 1a via the antireflection film 35 and the base plate 2. The incident angle θ of the light beam was set to 20° and 39°. In other words, the incident angle θ of the light beam was changed between 20° and 39°.

THIRD EXAMPLE

A third example was similar to the first example except that an antireflection film was not formed.

FOURTH EXAMPLE

A fourth example was similar to the first example except that an anti-scattering film was not formed.

FIFTH EXAMPLE

A fifth example was similar to the first example except that sealing material was made of epoxy thermosetting resin having a refractive index of 1.41.

Figure 6:
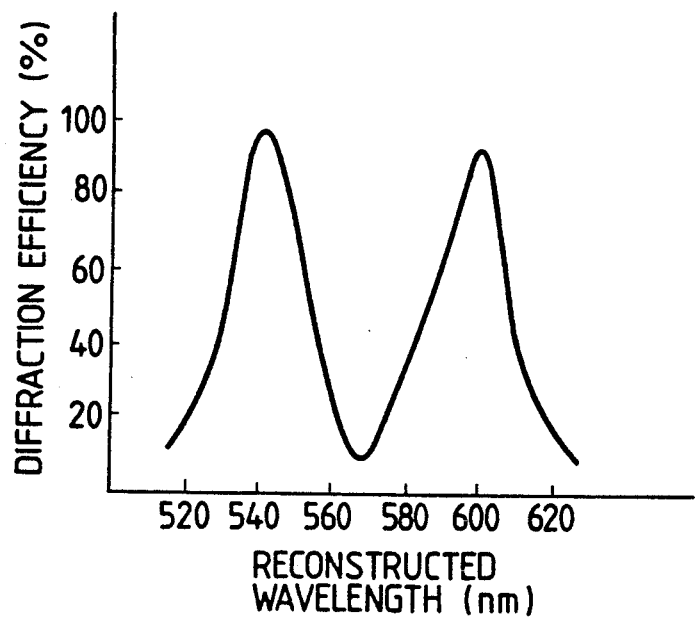
FIG. 6 is a diagram showing the relation between the diffraction efficiency and the reconstructed light wavelength in holograms in embodiments of this invention.

Noise measurement experiments were done on the previously-mentioned first, second, third, fourth, and fifth examples of holograms used in the head-up display of FIG. 3. Specifically, for each of the first, second, third, fourth, and fifth examples of holograms, the brightness of a noise image (spurious image) was measured under conditions where the brightness of a normal image was equal to 3,000 cd/m² and an indication distance was equal to 1.9 m. Regarding each of the first, second, third, fourth, and fifth examples of holograms, the noise ratio NR was calculated by referring to the following equation.

$$NR = (P/Q) \times 100\%$$

where P denoted the brightness of a noise image, and Q denoted the brightness of a normal image. The maximal value of the measured brightnesses which were obtained at points outside the normal image was used as the brightness of the noise image. During the experiments, the diffraction-wavelength characteristics of the holograms were given as illustrated in FIG. 6. As shown in FIG. 6, the diffraction efficiency was peaked at a reconstructed light wavelength of 540 nm and also at a reconstructed light wavelength of 600 nm.

Figure 7:
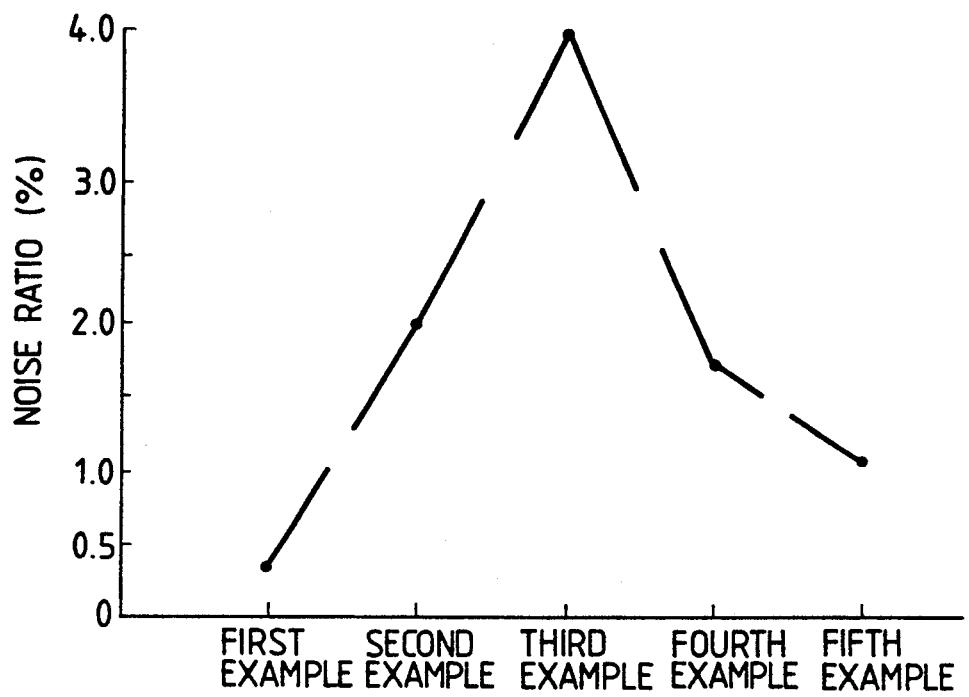
FIG. 7 is a diagram showing the noise ratios of examples of holograms in embodiments of this invention.

FIG. 7 shows the calculated noise ratios of the first, second, third, fourth, and fifth examples of holograms which were obtained at a reconstructed light wavelength of 540 nm. As shown in FIG. 7, the first example of the hologram had the smallest noise ratio. In addition, an image indicated via the first example of the hologram was adequately clear. Setting the sealing layer width "W" to 5 mm ensured that the predetermined pattern on the hologram element did not disappear even after the hologram element remained in atmosphere having a temperature of 65° C. and a relative humidity (RH) of 95% for 1,000 hours.

What is claimed is:

1. A hologram comprising:
   an optically transparent base plate having first and second opposite surfaces;
   a hologram element provided on the first surface of the base plate, where the hologram element has a predetermined holographic pattern;
   an optically transparent member having first and second opposite surfaces, wherein the first surface of the optically transparent member faces the hologram element; and
   means for preventing light, which is reflected at a boundary between the second surface of the optically transparent member and atmosphere after it has successively passed through the transparent base plate, the hologram element, and the optically transparent member, from travelling back to the hologram element,
   wherein the preventing means comprises an anti-scattering film which is comprised of a mixture of predetermined pigment and predetermined synthetic resin binder provided on the second surface of the optically transparent member.

2. The hologram of claim 1, further comprising sealing material provided between the member and the base plate with the hologram element, and bonding the member and the base plate with the hologram element together.

3. A hologram comprising:
   an optically transparent base plate having first and second opposite surfaces;
   a hologram element provided on the first surface of the base plate, where the hologram element has a predetermined holographic pattern;
   an optically transparent member having first and second opposite surfaces, wherein the first surface of the optically transparent member faces the hologram element; and
   means for preventing light, which is reflected at a boundary between the second surface of the optically transparent member and atmosphere after it has successively passed through the transparent base plate, the hologram element, and the optically transparent member, from travelling back to the hologram element;
   sealing material provided between the optically transparent member and the base plate for bonding the optically transparent member with the base plate,
   wherein the sealing material is made of at least one of a group consisting of organic resin of an ultraviolet-ray hardening type, and organic resin of a thermosetting type.

4. A hologram comprising:
   an optically transparent base plate having first and second opposite surfaces;
   a hologram element provided on the first surface of the base plate, where the hologram element has a predetermined holographic pattern;
   a first reflection control layer, which is optically transparent and which is provided at a side of the second surface of the base plate, for preventing light, which is reflected at a boundary between the second surface of the base plate and atmosphere after it has been applied to the second surface of the base plate, from travelling in a direction of reconstructed light generated via the hologram element;

an optically transparent member having first and second opposite surfaces, wherein the first surface of the member faces the hologram element;

a second reflection control layer provided on the second surface of the member for preventing light, which is reflected at a boundary between the second surface of the member and atmosphere after it has successively passed through the transparent base plate, the hologram element, and the optically transparent member, from travelling back toward the hologram element; and sealing material provided between the optically transparent member and the base plate for bonding the optically transparent member with the base plate, wherein the sealing material is made of at least one of a group consisting of organic resin of an ultraviolet-ray hardening type, and organic resin of a thermosetting type.

5. A hologram comprising:
an optically transparent base plate having first and second opposite surfaces;
a hologram element provided on the first surface of the base plate and having a predetermined holographic pattern;
a first optically transparent member having first and second opposite surfaces, wherein the first surface of the first member faces the hologram element;
first means for preventing light, which successively passes through the transparent base plate, the hologram element, and the first member and is then reflected at a boundary between the second surface of the first member and an atmosphere, from travelling back to the hologram element;
a second optically transparent member having first and second opposite surfaces, wherein the first surface of the second member faces the second surface of the base plate; and
second means for preventing light, which is applied toward the second surface of the second member and is reflected at a boundary between the second surface of the second member and an atmosphere, from travelling in a direction equal to a direction of travel of reconstructed light generated via the hologram element.

6. The hologram of claim 5, wherein the first means comprises an anti-scattering film provided on the second surface of the first member.

7. The hologram of claim 5, wherein the second means comprises an antireflection film provided on the second surface of second member.

8. The hologram of claim 5, further comprising sealing material for bonding the first member, the base plate, and the second member together.

9. The hologram of claim 8, wherein the sealing material is made of at least one of organic resin of an ultraviolet-ray hardening type and organic resin of a thermosetting type.

10. The hologram of claim 5, wherein the holographic pattern comprises a first sub pattern and a second sub pattern having different pitches respectively.

11. The hologram of claim 7, wherein the antireflection film is formed after the hologram element is formed.

12. The hologram of claim 4, wherein the first reflection control layer comprises an anti-reflection film.

13. The hologram of claim 12, wherein the anti-reflection film is made of at least one of a group consisting of $MgF_2$, $TiO_2$, $ZrO_2$, and $SiO_2$.

14. A hologram comprising:
an optically transparent base plate having first and second opposite surfaces;
a hologram element provided on the first surface of the base plate, where the hologram element has a predetermined holographic pattern;
an optically transparent member having first and second opposite surfaces, wherein the first surface of the member is positioned toward the hologram element; and
means for preventing light, which is reflected at a boundary between the second surface of the optically transparent member and atmosphere after it has successively passed through the transparent base plate, the hologram element, and the optically transparent member, from travelling back toward the hologram element,
wherein the preventing means comprises an anti-scattering film which is provided on the second surface of the optically transparent member, and the anti-scattering film comprises at least one of a group consisting of a tape and a black paint.

15. A hologram comprising:
an optically transparent base plate having first and second opposite surfaces;
a hologram element provided on the first surface of the base plate, where the hologram element has a predetermined holographic pattern;
a first reflection control layer, which is optically transparent and which is provided at a side of the second surface of the base plate, for preventing light, which is applied to the second surface of the base plate and is reflected at a boundary between the second surface of the base plate and atmosphere, from travelling in a direction of reconstructed light generated via the hologram element;
an optically transparent member having first and second opposite surfaces, wherein the first surface of the member faces the hologram element; and
a second reflection control layer provided on the second surface of the member for preventing light, which is reflected at a boundary between the second surface of the member and atmosphere after it has successively passed through the transparent base plate and the hologram element to the optically transparent member, from travelling back to the hologram element;
wherein the first reflection control layer comprises an anti-reflection film directly contacting the base plate.

16. The hologram of claim 16, further comprising a sealing layer extending between the optically transparent member and both the hologram element and the base plate for bonding the base plate with the optically transparent member.

17. A hologram comprising:
an optically transparent base plate having first and second opposite surfaces;
a hologram element provided on the first surface of the base plate, where the hologram element has a predetermined holographic pattern;
an anti-scattering film provided on the second surface of the base plate which directly contacts the base plate;

an optically transparent member having first and second opposite surfaces, wherein the first surface of the member faces the hologram element; and
an anti-reflection film provided on the second surface of the optically transparent member.

18. The hologram of claim 17, further comprising a sealing layer positioned between the optically transparent member and both the hologram element and the base plate for bonding the base plate with the optically transparent member.

* * * * *